United States Patent [19]

Akira et al.

[11] Patent Number: 5,861,186

[45] Date of Patent: *Jan. 19, 1999

[54] PROCESS FOR MANUFACTURING A DEHYDRATED INSTANT-NOODLES PRODUCT

[75] Inventors: Fujiwara Akira; Kohsaka Satoshi; Nehashi Hiroki; Matsuoka Yoshihiro, all of Tokyo, Japan

[73] Assignee: Myojo Foods Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 654,986

[22] Filed: May 29, 1996

[30] Foreign Application Priority Data

Aug. 14, 1995 [JP] Japan ..................................... 7-207057

[51] Int. Cl.⁶ .................................. A23L 1/16; A23P 1/14
[52] U.S. Cl. .......................... 426/446; 426/451; 426/507; 426/511
[58] Field of Search ..................................... 426/451, 557, 426/445, 446, 447, 443, 465, 520, 507, 511; 99/323.9, 443 C, 323.1, 474

[56] References Cited

U.S. PATENT DOCUMENTS 3,332,781  7/1967  Benson et al. .......................... 426/446
3,352,686  11/1967 Mancuso et al. .
4,154,861  5/1979  Smith ................... 426/520 X
4,185,125  1/1980  Sakakibara et al. .................... 426/439
4,234,612  11/1980 Sakakibara et al. .................... 426/394
4,243,689  1/1981  Kokeguchi et al. .................... 426/557
4,370,352  1/1983  Murakami et al. ..................... 426/557
4,783,339  11/1988 Horner .................................... 426/557
5,500,236  3/1996  Miller et al. ............................ 426/451

FOREIGN PATENT DOCUMENTS 52-44260   4/1977  Japan .
54-86642   7/1979  Japan .
54-44731   12/1979 Japan .
61-043970  3/1986  Japan .

*Primary Examiner*—Arthur L. Corbin
*Attorney, Agent, or Firm*—Pennie & Edmonds LLP

[57] ABSTRACT

A process for manufacturing a dry instant-noodles product comprising steaming or boiling noodle strings that have been cut out of a dough, transporting said strings on a net conveyor, and applying air, an inert gas or a mixture thereof to said strings from both above and below so as to expand and dry them; wherein the air, inert gas or mixture thereof is controlled to have an elevated temperature of 100°–200° C. and supplied from a separate high-pressure compartment at high speed through spray nozzle tubes provided both above and below said net conveyor.

1 Claim, 1 Drawing Sheet

PROCESS FOR MANUFACTURING A DEHYDRATED INSTANT-NOODLES PRODUCT

BACKGROUND OF THE INVENTION

This invention relates to a method of drying noodles and, more particularly, to a method by which steamed noodles are allowed to expand and dehydrate rapidly within a short time with process air, inert gas (e.g., $N_2$, He or $CO_2$) or mixtures thereof that are delivered at high temperature and speed from spray nozzle tubes.

Three well-known drying methods are currently employed in the instant-noodles products and they are by frying, by drying with hot gases and by drying with superheated steam. As for the second drying method which uses hot gases, Japanese Laid-Open Patent Application No. 44260/1977 teaches a process in which steamed noodles prepared by known procedures are treated with hot gases at elevated temperatures of about 150° C. for a short period of time. Since the noodles to be dried by this method are placed in a specified quantity on a net conveyor, even a hot gas heated to as high as about 150° C. is incapable of dehydrating the interior of the noodles although their surface may be dehydrated quickly. If the drying is continued for a sufficient time to completely dehydrate the interior of the noodles, their surface will be scorched.

Japanese Laid-Open Patent Application No. 86642/1979 teaches a method in which a sealed drying chamber is supplied continuously with steamed noodles, which are expanded to foam with a hot gas of high water content that has been heated to 105°–180° C. and which is recirculated for blowing against the strings of noodles at a rate of 2–10 m/sec. This method which uses the recirculating hot gas of high water content will cause smaller degrees of discoloration and scorching than the ordinary drying method using heated gases at high temperatures. On the other hand, the hot gas of high water content is simply circulated within the sealed drying chamber, so the thermal efficiency of the method on steamed. or boiled noodles is far from being satisfactory and, in addition, the high water content of the hot gas permits the noodles to be expanded to foam by a limited degree.

Japanese Patent Publication No. 44731/1979 teaches a process for producing dry noodles which comprises adjusting the water content of steamed or boiled strings of noodles to about 8–25% and treating them with a hot gas steam at about 120°–250° C. for about 5–90 seconds. According to the disclosure in this reference, if the water content of the steamed or boiled strings of noodles is adjusted to more than 25%, their interior is dehydrated insufficiently to achieve quick drying. This would be due to the inefficient contact of the steamed or boiled strings of noodles with the heated gas stream. It is therefore desired to develop a drying method by which heated gases can be applied uniformly not only to the surface but also to the interior of steamed or boiled strings of noodles having a specified thickness while assuring high efficiency to achieve rapid drying of the noodles so that they are expanded to foam within a short period of time. On the other hand, the rapid expansion and foaming of noodles by drying with heated gases at elevated temperatures is said to accelerate the oxidation of flavor, coloring matter, oils and vitamins in the noodles, thereby damaging their characteristic flavor and color, as well as vitamins and other nutrients.

SUMMARY OF THE INVENTION

The present invention has been accomplished under these circumstances and has as an object providing a process for manufacturing dehydrated instant-noodles products that enables not only the surface but also the interior of noodles to be expanded to foam uniformly and quickly by drying with heated gases at elevated temperatures while ensuring against scorching of the surface of the noodles, thereby yielding a quick-rehydration instant-noodles product that has a glossy appearance and a good flavor.

The stated object of the invention can be attained by a process comprising steaming or boiling strings of noodles that have been prepared in the usual manner and transporting said strings of noodles on a net conveyor with a hot gas being applied to said strings of noodles so as to expand and foam them within a very short period of time, said hot gas being controlled to have an elevated temperature of 100°–200° C. and supplied from a separate high-pressure compartment at high speed through spray nozzle tubes provided both above and below said transport net conveyor.

In a preferred embodiment, the steamed or boiled strings of noodles are preliminarily adjusted to have a water content of 15–32% with a hot gas heated to an elevated temperature.

The hot gas may comprise atmospheric air, an inert gas such as $N_2$, He or $CO_2$ or mixtures thereof. It should particularly be noted that if a gaseous mixture containing an inert gas is used as the hot gas, the oxidation of dyes, oils and vitamins in the noodles can be prevented, to thereby retain their characteristic flavor and color while ensuring against damage of vitamins and other nutrients.

DETAILED DESCRIPTION OF THE INVENTION

Figure 1:
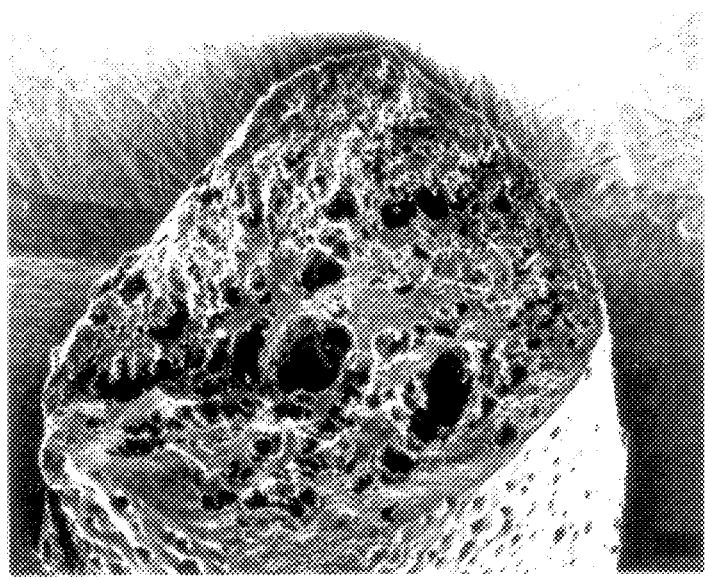
FIG. 1 is an electron micrograph (×50) showing a cross section of a string of the noodles dried in Example 1 of the invention.

The present invention will now be described in detail.

First, strings of noodles as prepared in the usual manner are steamed or dried; thereafter, the noodles are packed in metered portions into molds, which are transferred onto a transport conveyor. The conveyor must have both air permeability and heat resistance such that a hot gas heated at an elevated temperature can be applied through spray nozzle tubes that are provided both above and below the conveyor. To this end, the conveyor may be in the form of a screen that is made of iron, aluminum, stainless steel, brass or the like and which has openings of 5–10 mesh. The spray nozzle tubes may also be made of iron, aluminum, stainless steel, brass or the like.

The spray nozzle tubes for use in the present invention are preferably in a cylindrical form having an inside diameter of 10–20 mm and a length of 100–150 mm. If desired, each of these tubes may be fitted with a detachable nozzle at the tip. The hot gas to be ejected through the spray nozzle tubes is generated in a separate high-pressure compartment and transported through a pipe as it is subjected to heat exchange with externally supplied superheated steam and the resulting hot gas having an elevated temperature of 100°–200° C. is passed through the nozzle tubes to be applied onto the steamed or boiled noodles on the moving net conveyor. The quantity of the hot gas being ejected through the nozzle tubes can be adjusted by controlling the rotating fan speed with an inverter. The spray nozzle tubes above the net conveyor are preferably positioned to alternate with those below the net conveyor in order to ensure that the hot gas being ejected from the spray nozzle tubes located above the net conveyor will not cancel the hot gas coming from the tubes located below the net conveyor. The staggered arrangement of the spray nozzle tubes will allow the applied hot gas to go through the steamed or boiled noodles with such high efficiency that not only the surface of block of noodles but also their interior can be expanded uniformly.

The hot gas to be supplied as a drying medium has suitably a temperature of 100°–200° C. If its temperature is less than 100° C., the noodles will not expand; beyond 200° C., the noodles tend to scorch and must be treated within a short time but then the interior of the layered noodles will not expand fully. Preferably, the hot gas has a temperature of 135°–155° C. The hot gas is effectively blown at a speed of 10–35 m/sec. If the blow speed is less than 10 m/sec, the noodles will not expand adequately; beyond 35 m/sec, the noodles will not expand uniformly. The noodles can be expanded in a desired way by satisfying these temperature and speed conditions.

In a preferred embodiment, the water content of the steamed or boiled noodles may be adjusted to 15–32% by a preliminary drying step in which a hot gas at a lower temperature of 100°–120° C. is ejected through the spray nozzles at a speed of 20–40 m/sec, preferably 20–30 m/sec. This adjustment is effective in preventing the noodles from expanding so suddenly as to create voids in the interior. In consideration of this need, cutting blades of #10 (for yielding 3-mm wide strings) and smaller numbers are suitable for cutting out thick strings of noodles from the dough. If the temperature for the preliminary drying step is less than 100° C., the noodles tend to shrink as a whole, adversely affecting the process conditions of the subsequent step, namely, expansion. If the preliminary drying temperature is higher than 120° C., the conditions of the subsequent expanding step are prone to become uneven and the mouth feel of the final noodles product will be affected substantially. If the predrying air is blown at a speed slower than 20 m/sec, the drying will proceed so slowly that the noodles tend to shrink as a whole. If the blowing speed is faster than 40 m/sec, the Intended predrying effect is not attained and the noodles will expand so rapidly that there is a high likelihood for the formation of voids in their interior. If the water content of the noodles is reduced to below 15% by the preliminary drying, they will not readily expand in the subsequent step: if the adjusted water content is higher than 32%, uniform drying is difficult to achieve, even in the subsequent expanding step.

In the present invention, a hot gas at the specified high temperature past through the upper spray nozzle tubes about 125 mm long is applied at high speed In a direction normal to the layers of noodles; hence, the hot air will quickly penetrate the layers of noodles from the top to the bottom side. At the same time, a similarly hot gas past through the lower spray nozzle tubes is applied to the bottom side of tho layers of noodles, thereby allowing simultaneous and quick drying of the layers of noodles on both top and bottom sides. As a result, the layers of noodles can be uniformly expanded not only on the surface but also in the interior within a short period of time.

The following examples are provided for the purpose of further illustrating the present invention but are in no way to be taken as limiting.

EXAMPLE 1

Instant Chinese Noodles Product (a)

A dough 1.00 mm thick was prepared in the usual manner. Round strings were cut out of the dough with a blade #20 (for string width of 1.5 mm). The strings were steamed or boiled for 2 min, divided into portions weighing 110–115 g and packed in layers on net-like buckets. The layered strings were then subjected to preliminary drying by contact with hot air (110° C.) that was blown at a speed of 25 m/sec to adjust the water content of strings to about 20%. Thereafter, hot air having a higher temperature (150° C.) was blown through spray nozzle tubes at a speed of 30 m/sec for 150 seconds until the strings expanded to give the desired instant Chinese noodles product (a) having a final water content of 10%.

EXAMPLE 2

Instant Chinese Noodles Product (b)

A dough 1.00 mm thick was prepared in the usual manner. Round strings were cut out of the dough with a blade #20 (for string width of 1.5 mm). The strings were steamed or boiled for 2 min, divided into portions weighing 110–115 g and packed in layers on net-like buckets. The layers strings were then subjected to preliminary drying by contact with a hot gas (110° C.) consisting of a mixture of 5% air and 95% inert gas that was blown at a speed of 25 m/sec to adjust the water content of the strings to about 20%. Thereafter, a hot gas having a higher temperature (150° C.) consisting of 5% air and 95% inert gas was blown through spray nozzle tubes at a speed of 30 m/sec for 150 seconds until the strings expanded to give the desired instant Chinese noodles product (b) having a final water content of 10% which was reasonably protected against deterioration in flavor and color, as well as reduction in the contents of vitamins and other nutrients.

EXAMPLE 3

Instant Chinese Noodles Product (c)

A dough 1.00 mm thick was prepared in the usual manner. Round strings were cut out of the dough with a blade #20 (for string width of 1.5 mm). The strings were steamed or boiled for 2 min, divided into portions weighing 110–115 g and packed in layers on net-like buckets. The layered strings were then subjected to preliminary drying by contact with a hot (110° C.) inert gas ($N_2$) that was blown at a speed of 25 m/sec to adjust the water content of the strings to about 20% Thereafter, an insert gas ($N_2$) having a higher temperature (150° C.) was blown through spray nozzle tubes at a speed of 30 m/sec until the strings expanded to give the desired instant Chinese noodles product (c) having a final water content of 10% which was reasonably protected against deterioration in flavor and color, as well as reduction in the contents of vitamins and other nutrients.

EXAMPLE 4

Instant Udon Product

A dough was prepared as in Example 1, except that it was 1.2 mm thick. Square strings were cut out of the dough with a blade #12 (for string width of 2.5 mm). The strings were steamed or boiled for 2 min, divided into portions each weighing 112 g and packed in layers on net-like buckets. The layered strings were then subjected to preliminary drying by contact with hot air (110° C.) that was blown at a speed of 30 m/sec for 35 seconds to adjust the water content of the strings to about 18%. Thereafter, hot air having a higher temperature (140° C.) was blown through spray nozzle tubes at a speed of 30 m/sec until the strings expanded to give the desired instant Udon product having a final water content of 12%.

The dry noodles products prepared in Examples 1–3 could be reconstituted into an edible state by immersion in boiling water for only 2 minutes and 30 seconds. Even the thicker product of Example 4 could be reconstituted in 4 minutes and may well be called an instant-noodles product. All noodles were found to be satisfactory in a subjective sensory test because they had a smooth surface and yet experienced little exudation, thereby presenting good mouth feel with high elasticity. The noodles that were expanded and dried with an insert gas in Examples 2 and 3 were particularly satisfactory since they had a good flavor and a glossy appearance.

EXAMPLE 5

Japanese Instant Soba Product

A dough 1.00 mm thick was prepared in the usual manner from a mixture of 70% wheat flour and 30% buckwheat flour. Square strings were cut out of the dough with a blade #20 (for string width of 1.5 mm). The strings were steamed or boiled at a pressure of 0.4 kg/cm$^2$ for 2 min, divided into portions each weighing 80 g and packed in layers on net-like buckets. The layered strings were then subjected to preliminary drying by contact with hot air (110° C.) that was blown at a speed of 30 m/sec to adjust the water content of the strings to about 18–20%. Thereafter, hot air having a higher temperature (150° C.) was blown through spray nozzle tubes at a speed of 30 m/sec for about 1 min until the strings expanded to give the desired instant Soba product having a final water content of 11–12%.

EXAMPLE 6

Instant Pasta-Like Noodles Product

A dough 1.1 mm thick was prepared in the unusual manner. Round strings were cut out of the dough with a blade #16 (for string width of 1.9 mm). The strings were steamed or boiled for 2 min, divided into portions each weighing 80 g and packed in layers on net-like buckets. The layered strings were then subjected to preliminary drying by contact with hot air (120° C.) that was blown at a speed of 30 m/sec to adjust the water content of the strings to about 18–20%. Thereafter, hot air having a higher temperature (150° C.) was blown through spray nozzle tubes at a speed of 30 m/sec for about 150 seconds until the strings expanded to give the desired instant pasta-like noodles product having a final water content of 10–11%.

Figure 2:
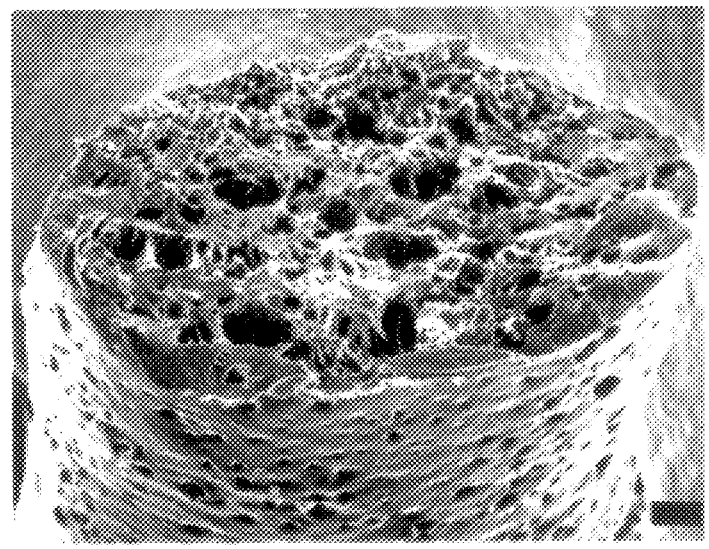
FIG. 2 is an electron micrograph (×50) showing a cross section of a string of the noodles dried in Example 2 of the invention.
Figure 3:
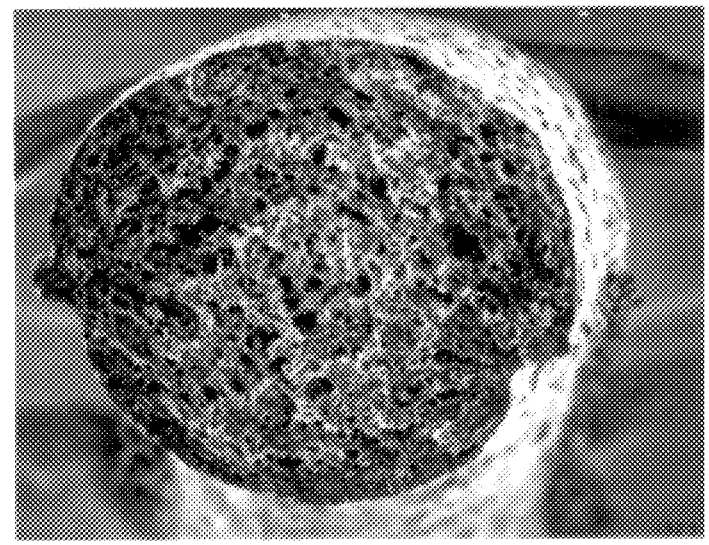
FIG. 3 is an electron micrograph (×50) showing a cross section of a string of the fried instant-noodles produced by a conventional method.

FIGS. 1 and 2 are electron micrographs that were taken of cross sections of the instant-noodles products of Examples 1 and 2 at a magnification of 50 to demonstrate their expanded structures. Obviously, the products manufactured by the process of the invention expanded to a greater extent than the conventional fried instant-noodles product shown in FIG. 3 (×50).

In short, the process of the invention is characterized by applying fast streams of a hot gas through spray nozzle tubes in a direction vertical to the block of noodles. Since the applied hot gas will penetrate to the interior of layered strings in a uniform and rapid way, the interior of the noodles can be adequately expanded. In addition, the noodles have a porous inner structure that permits easy permeation of boiling water through the noodles, which therefore can be rehydrated to an edible state within a sufficiently short time that they may well be called "instant-noodles products". The noodles are also satisfactory in a sensory evaluation since they have a smooth surface, are substantially free from the solute of carbohydrates and yet present a reasonable degree of elasticity.

What is claimed is:

1. A process for manufacturing a dry instant-noodles product comprising:
    (a) steaming or boiling noodle strings that have been cut out of a dough,
    (b) transporting said steamed or boiled noodle strings, in layers having a top side and a bottom side, on a net conveyor,
    (c) preliminarily drying the steamed or boiled noodle strings on the net conveyor by applying air, inert gas or mixture thereof, at a temperature of about 100° C. to about 120° C., through spray nozzles above the net conveyor and below the net conveyor at a speed of about 20 m/sec to about 40 m/sec to adjust the water content of the noodle strings to the range of approximately 15% to approximately 32%;
    (d) drying the preliminarily dried noodle strings on the net conveyor by applying air, inert gas or mixture thereof at a temperature of about 100° C. to about 200° C. through spray nozzles at a speed of about 10 m/sec to about 35 m/sec to adjust the water content of the noodle strings to a final water content which is less than the water content of the preliminarily dried noodle strings,
    wherein said spray nozzles are provided both above and below said net conveyor and the spray nozzles above the net conveyor are positioned to alternate with those below the net conveyor and
    wherein said air, inert gas or mixture thereof penetrates the noodle strings both from the top to the bottom side and from the bottom to the top side of the layers, thereby allowing simultaneous and quick expansion and drying of the noodle strings.

* * * * *